(12) United States Patent
Kim (10) Patent No.: US 11,030,050 B2
(45) Date of Patent: Jun. 8, 2021

(54) METHOD AND DEVICE OF ARCHIVING DATABASE AND METHOD AND DEVICE OF RETRIEVING ARCHIVED DATABASE

(71) Applicant: ARMIQ Co., Ltd., Seoul (KR)

(72) Inventor: Oxoo Kim, Seoul (KR)

(73) Assignee: ARMIQ Co., Ltd., Seoul (KR)

( * ) Notice: Subject to any disclaimer, the term of this patent is extended or adjusted under 35 U.S.C. 154(b) by 196 days.

(21) Appl. No.: 16/077,208

(22) PCT Filed: Oct. 13, 2016

(86) PCT No.: PCT/KR2016/011463
§ 371 (c)(1),
(2) Date: Aug. 10, 2018

(87) PCT Pub. No.: WO2017/146337
PCT Pub. Date: Aug. 31, 2017

(65) Prior Publication Data
US 2019/0026189 A1    Jan. 24, 2019

(30) Foreign Application Priority Data

Feb. 26, 2016  (KR) .......................... 10-2016-0023401

(51) Int. Cl.
*G06F 11/14* (2006.01)
*G06F 16/21* (2019.01)
(Continued)

(52) U.S. Cl.
CPC ........ *G06F 11/1451* (2013.01); *G06F 16/113* (2019.01); *G06F 16/21* (2019.01); *G06F 16/2282* (2019.01)

(58) Field of Classification Search
None
See application file for complete search history.

(56) References Cited

U.S. PATENT DOCUMENTS

2012/0310890 A1    12/2012  Dodd et al.
2014/0046908 A1*   2/2014   Patiejunas ........... G06F 16/2308
                                                         707/687

FOREIGN PATENT DOCUMENTS

EP        2937794 A1     10/2015
JP     2010-287024 A    12/2010
(Continued)

OTHER PUBLICATIONS

"Buffer—CLC Definition," The Computer Language Company Inc. Retrieved on Apr. 18, 2020 from https://www.computerlanguage.com/results.php?definition=buffer. (Year: 2020).*

(Continued)

*Primary Examiner* — Tony Mahmoudi
*Assistant Examiner* — Umar Mian
(74) *Attorney, Agent, or Firm* — Novick, Kim & Lee, PLLC; Sang Ho Lee (57) ABSTRACT

Provided is a database archiving method. According to the exemplary embodiment of the present invention, a database archiving method includes: selecting at least one record group including a plurality of records from an original table from which data is archived, based on selection information on at least one of a time and a field value; storing group compression data compressed to be created for every record group and the selection information corresponding to the group compression data in a compression table, with respect to each of at least one selected record group; and deleting a plurality of records included in at least one selected record group from the original table.

8 Claims, 6 Drawing Sheets

(51) Int. Cl.
  *G06F 16/22* (2019.01)
  *G06F 16/11* (2019.01)

(56) References Cited

FOREIGN PATENT DOCUMENTS

| JP | 2011-048679 A | 3/2011 |
| JP | 2013-065224 A | 4/2013 |
| KR | 10-2014-0072929 A | 6/2014 |

OTHER PUBLICATIONS

Kim, Ju Cheol: "What is Archiving?", STORAGETEC, Feb. 10, 2004, p. 1, lines 7-11. Retrieved from the Internet <URL: http://blog.naver.com/rainow/40000828618>.

Nishijima Yuji Search by dividing into subtasks, Nikkei Computer, Nikkei BP, No. 354, pp. 160~161 (Dec. 12, 1994).

\* cited by examiner

METHOD AND DEVICE OF ARCHIVING DATABASE AND METHOD AND DEVICE OF RETRIEVING ARCHIVED DATABASE

TECHNICAL FIELD

The present invention relates to a method and a device of archiving a database and a method and a device of retrieving an archived database, and more particularly, to a method and a device of archiving a database using a data compression technique and a method and a device of retrieving a compressed and archived database.

BACKGROUND ART

As data producing and consuming means, such as PCs, laptop computers, and smart phones, is widely spreading along with the spread of Internet and development of data communication techniques, an amount of data which is produced and consumed today is exponentially increasing.

Methods of managing data using a database to effectively classify and utilize the data are widely used in various companies, organizations, and schools. However, as the amount of data is exponentially increased, a capacity of the database will soon reach its limit and there is a limitation in continuously expanding the capacity of database in terms of cost and management.

Therefore, there is a growing interest in techniques which efficiently archive the database to save the capacity. Specifically, there is a growing interest in a method and a device of archiving a database using a data compression technique and a method and a device of retrieving a compressed and archived database.

DISCLOSURE

Technical Problem

An object of the present invention is to provide a database archiving method and device which classify records of a database based on predetermined criteria and compress and archive the database for every classified record to save a capacity of the database.

Another object of the present invention is to provide an efficient database retrieving method and a device thereof which retrieve the database archived by the above-mentioned method, in parallel.

Technical Solution

In order to achieve the above-mentioned object, the present invention provides a database archiving method including: selecting at least one record group including a plurality of records from an original table from which data is archived, based on selection information on at least one of a time and a field value; storing group compression data compressed to be created for every record group and the selection information corresponding to the group compression data in a compression table, with respect to each of at least one selected record group; and deleting a plurality of records included in at least one selected record group from the original table.

Desirably, the storing of selection information in a compression table may include, with respect to each of at least one selected record group, storing data of a plurality of records included in the record group in a buffer; creating the group compression data by compressing data stored in the buffer; obtaining the selection information corresponding to the created group compression data; and storing the group compression data in the same record on the compression table as the selection information.

Desirably, the database archiving method may further include: when there is an exceed record group in which the number of records exceeds a threshold value, dividing the exceed record group into a plurality of record groups in which the number of records is equal to or smaller than the threshold value, and the storing of the selection information in a compression table may further store a serial number assigned to each of the plurality of divided record groups in the compression table.

Further, in order to achieve the above-mentioned object, the present invention provides a database archiving device including: a data selecting unit which selects at least one record group including a plurality of records based on selection information on at least one of a time and a field value, from an original table from which data is archived; a data compressing unit which compresses and creates group compression data for every record group, with respect to each of at least one selected record group; and a DB management unit which stores the group compression data and the selection information corresponding to the group compression data in the compression table and deletes a plurality of records included in at least one selected record group from the original table.

Desirably, the data compressing unit, with respect to each of at least one selected record group, may store data of a plurality of records included in the record group in a buffer and compress the data stored in the buffer to create the group compression data, and the DB management unit may obtain the selection information corresponding to the created group compression data and stores the group compression data in the same record on the compression table as the selection information.

Desirably, when there is an exceed record group in which the number of records exceeds a threshold value, the data selecting unit may divide the exceed record group into a plurality of record group in which the number of records is equal to or smaller than the threshold value, and the DB management unit may further store a serial number assigned to each of the plurality of divided record groups in the compression table.

Further, in order to achieve the above-mentioned object, the present invention provides an archived database retrieving method including: receiving a retrieving condition for retrieving a record desired by a user from a compression table including selection information on at least one of a time and a field value and group compression data created by compressing a plurality of records corresponding to the selection information; determining the number of DB retrieving processes for retrieving the records in parallel, based on at least one of a performance of a computer which performs retrieval and the number of group compression data corresponding to the selection information satisfying the retrieving condition; and retrieving records satisfying the retrieving condition in parallel, based on the determined number of DB retrieving processes.

Desirably, the determining of the number of DB retrieving processes for retrieving records in parallel may include: collecting computer performance information on at least one of the number of CPUs included in the computer, a capacity of a memory, and an input/output speed of a storage device; determining the number of group compression data corresponding to the selection information satisfying the received retrieving condition among the group compression data stored in the compression table; and determining the number of DB retrieving processes for retrieving the records in parallel, based on at least one of the collected computer performance information and the determined number of group compression data.

Desirably, the retrieving of records satisfying the retrieving condition in parallel may include: allocating at least one group compression data to each of the determined numbers of DB retrieving processes, based on the number of group compression data corresponding to the selection information satisfying the retrieving condition; and decompressing at least one group compression data which is allocated for every DB retrieving process and retrieving records satisfying the retrieving condition in parallel.

Desirably, the retrieving of records satisfying the retrieving condition in parallel may be performed further based on table structure information which is information on a type, a size, an order, and a name of a field included in the original table which is archived to the compression table.

Desirably, during the DB retrieving process, the retrieval may be performed using a process or a thread which is allocated to every DB retrieving process.

Further, in order to achieve the above-mentioned object, the present invention provides an archived database retrieving device including: a receiving unit which receives a retrieving condition for retrieving a record desired by a user from a compression table including selection information on at least one of a time and a field value and group compression data created by compressing a plurality of records corresponding to the selection information; a retrieval preparing unit which determines the number of DB retrieving processes for performing retrieval of the records in parallel, based on at least one of a performance of a computer which performs retrieval and the number of group compression data corresponding to the selection information satisfying the retrieving condition; and a parallel retrieving unit which retrieves records satisfying the retrieving condition in parallel, based on the determined number of DB retrieving processes.

Desirably, the retrieval preparing unit may collect computer performance information on at least one of the number of CPUs included in the computer, a capacity of a memory, and an input/output speed of a storage device, determine the number of group compression data corresponding to the selection information satisfying the received retrieving condition among the group compression data stored in the compression table, and determine the number of DB retrieving processes for retrieving the records in parallel, based on at least one of the collected computer performance information and the determined number of group compression data.

Desirably, the parallel retrieving unit may allocate at least one group compression data to each of the determined number of DB retrieving processes, based on the number of group compression data corresponding to the selection information satisfying the retrieving condition and decompress at least one group compression data which is allocated for every DB retrieving process and retrieves records satisfying the retrieving condition in parallel.

Desirably, the parallel retrieving unit may be further based on table structure information which is information on a type, a size, an order, and a name of a field included in the original table which is archived to the compression table.

Desirably, during the DB retrieving process, the retrieval may be performed using a process or a thread which is allocated to every DB retrieving process.

Advantageous Effects

According to the present invention, data stored in a database is classified according to a retrieving frequency and an importance and compressed and archived for every classification result so that a usage capacity of the database is dramatically reduced and a retrieving efficiency of archived data is maximized.

BEST MODE

Those skilled in the art may make various modifications to the present invention and the present invention may have various embodiments thereof, and thus specific embodiments will be illustrated in the drawings and described in detail in the detailed description. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. A term of and/or includes a combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination thoseof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, exemplary embodiments according to the present invention will be described in detail with reference to accompanying drawings.

Figure 1:
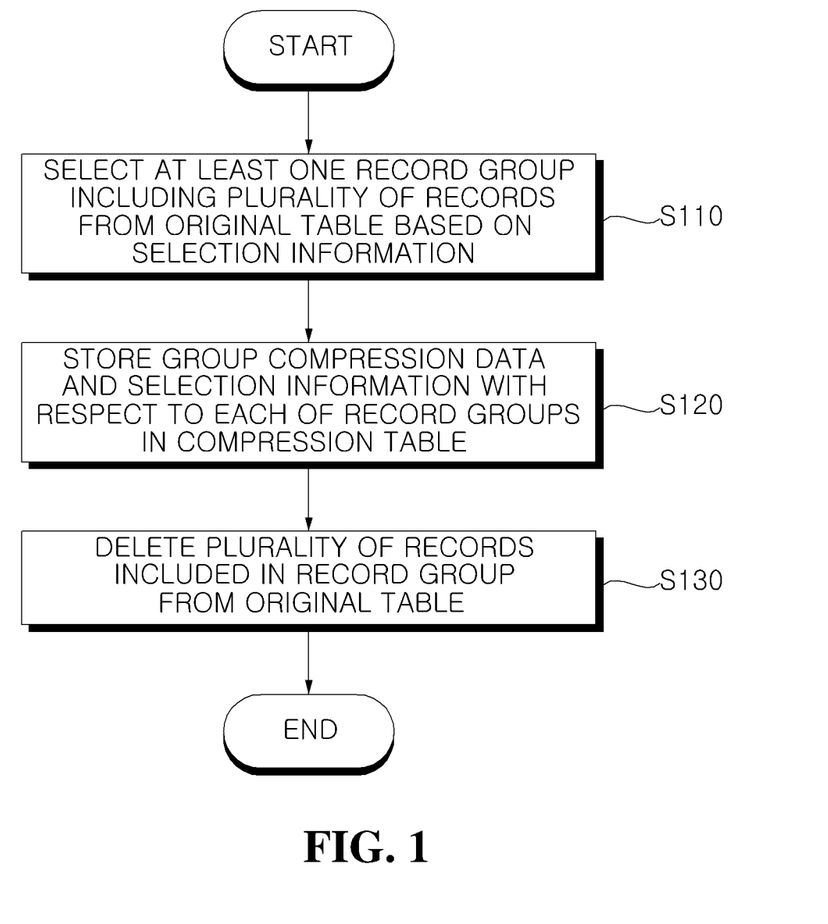
FIG. 1 is a flowchart illustrating a database archiving method according to an exemplary embodiment of the present invention.

FIG. 1 is a flowchart illustrating a database archiving method according to an exemplary embodiment of the present invention.

In step S110, a database archiving device selects at least one record group including a plurality of records from an original table from which data is archived, based on selection information on at least one of a time and a field value.

The table is a unit forming a basic structure for storing data in the database and the original table may be a table to be archived to save a capacity among a plurality of tables included in the database.

The database archiving device may select at least one record group including a plurality of records based on the selection information on at least one of a predetermined time and a field value, from the original table.

In this case, the selection information may be information on a time or information on a specific field value included in the original table or may be information including both the time and the field value. For example, the selection information on a time may be information for selecting a record for every month using a field for a time included in the original table. Further, the selection information on a field value may be information for selecting a record according to a field value using a predetermined field included in the original table. Further, the selection information on both a time and a field value may be information for selecting a record using both the field for a time and the predetermined field.

In the meantime, the field value included in the selection information may be determined as a field value of a field which is most frequently retrieved from the original table. In this case, the reason for selecting a record using the most frequently retrieved field is to maximize an efficiency when the archived database is retrieved after archiving the database.

The record group is a group configured by a plurality of records which is classified using the selection information, among the entire records included in the original table. One or more record groups may be created according to selecting criteria and a record group may be created to be limited to only some of the records as a target, rather than the entire original table, as needed. For example, a record group may be created to archive only records before 2015 in the original table.

In the meantime, the number of records included in one record group may be determined by comprehensively analyzing and examining the number of entire records included in the original table, a performance of a computer which retrieves a database, and a retrieving condition pattern of the database.

According to another exemplary embodiment, when there is an exceed record group in which the number of records exceeds a threshold value, among at least one selected record group, the database archiving device may divide the record group having the number of records which exceeds a threshold value into a plurality of record groups having the number of records which is equal to or smaller than the threshold value.

For example, a threshold value which is the number of records which can be included in one record group may be set to 100000. If the selected record group includes an exceed record group having the number of records which exceeds the threshold value, this may lead overload of the computer or inefficiency, which may be problematic.

Therefore, when one record group has 100000 or more records, the records are divided in the unit of 100000 records to create several record groups. For example, when one record group has 250000 records, the database archiving device may divide the exceed record group into a total of three record groups including two record groups having 100000 records and one record group having 50000 records.

In the meantime, since the plurality of record groups divided as described above is classified by the same selection information, there may be no method for distinguishing the plurality of record groups. Therefore, serial numbers (for example, 1, 2, 3, 4, . . . ) are assigned to each of the plurality of divided record groups to be stored in a serial number field of a compression table. In this case, when the archived database is retrieved, the retrieval may be performed by distinguishing each record group and this will be described below in more detail with reference to FIG. 7.

In step S120, the database archiving device stores group compression data compressed and created for every record group and selection information corresponding to the group compression data, with respect to each of at least one selected record group, in the compression table.

The compression table refers to a table in which the original table is compressed in the unit of record group so that the archived data is stored. Further, the compression table may include a field for storing group compression data which is compressed and created for every record group and at least one field for storing the selection information corresponding to the group compression data.

The group compression data may be binary data which is created by compressing the classified record group. A specific process of creating and storing group compression data in the compression table will be described below in more detail with reference to FIGS. 2, 7, and 8.

Finally, in step S130, the database archiving device deletes the plurality of records included in at least one selected record group from the original table.

An object of compressing and archiving the database is to save a database storage space so that the plurality of records included in the archived record group is deleted from the original table to save the database storage space.

As described above, according to the database archiving method of the exemplary embodiment of the present invention, the database is archived through a compressing procedure so that the capacity of the database may be dramatically saved. Further, the original table included in the database is classified by a time or a frequently retrieved field value and then archived so that a retrieving efficiency may be maximized when the archived data is retrieved later.

Figure 2:
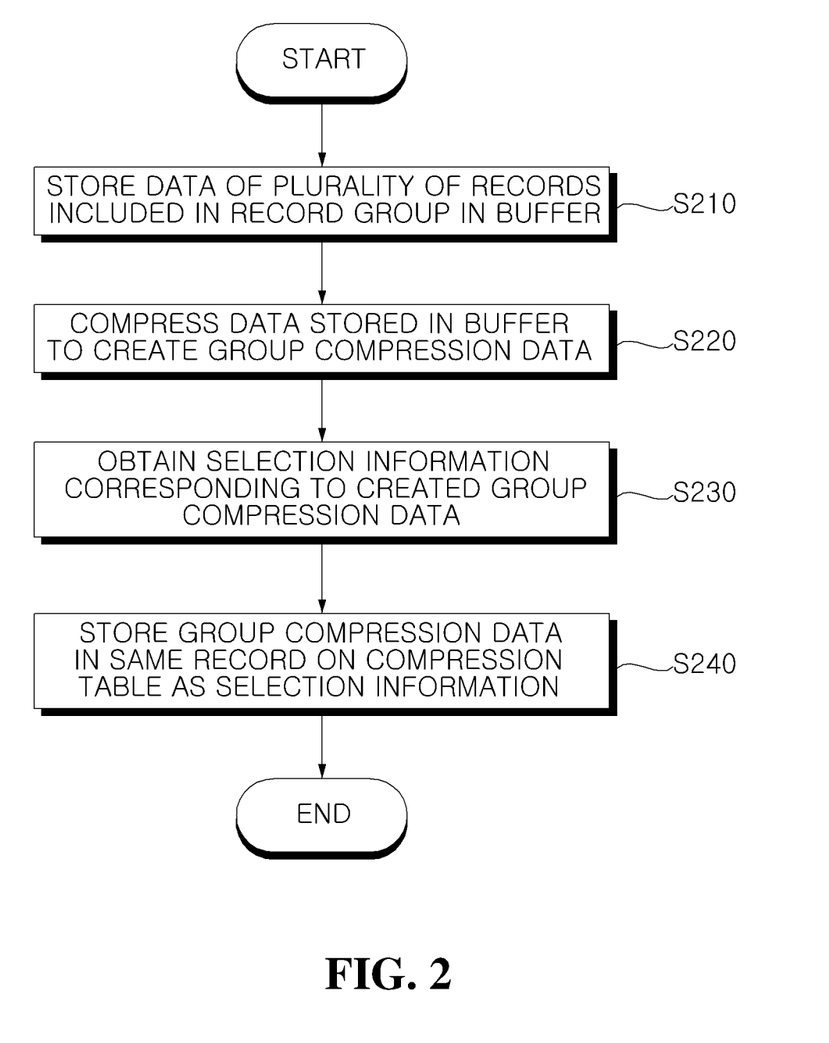
FIG. 2 is a flowchart illustrating a method of storing selection information in a compression table according to an exemplary embodiment of the present invention.

FIG. 2 is a flowchart illustrating a method of storing selection information in a compression table according to an exemplary embodiment of the present invention. A process of storing the selection information in the compression table may be performed on each of at least one record group.

In step S210, the database archiving device stores data of a plurality of records included in the record group in a buffer.

A size of the buffer in which the data of the plurality of records is stored may be determined based on a table structure (a number of fields, a type, and a size thereof) of the original table and a threshold value of records included in the record group.

For example, when it is assumed that the original table includes a total of three fields including DATE (eight characters), NAME (30 characters), and AGE (four byte of integers) and a threshold value of the number of records of the record group is 100000, if one character is calculated as two bytes, the size of the buffer may be at least 8 million bytes (approximately 8 megabytes) from the calculation of 100000×(8×2+30×2+4).

The database archiving device sequentially reads the records included in the record group and the field values of the records to sequentially store the records and the field values in the buffer.

In step S220, the database archiving device compresses the data stored in the buffer to create group compression data.

The group compression data may be a result of a binary form created by compressing data of the record group stored in the buffer. In this case, in order to avoid a loss due to the compression, a lossless compression algorithm such as ZIP, CTW, LZ77, or LZW may be used.

In step S230, the database archiving device obtains selection information corresponding to the created group compression data.

For example, when the database archiving device classifies the record group based on the selection information on the time and creates group compression data corresponding to the record group, the group compression data may be created from a plurality of records having selection information corresponding to February 2015. In the case, the selection information corresponding to the group compression data may be February 2015.

Finally, in step S240, the database archiving device stores the created group compression data in the same record on the compression table together with the obtained selection information.

The compression table may include a field for storing a binary type group compression data and at least one field for storing the selection information. That is, the created group compression data is stored in a field for storing compressed binary data and the selection information corresponding to the group compression data is distributed and stored in at least one field.

Figure 7:
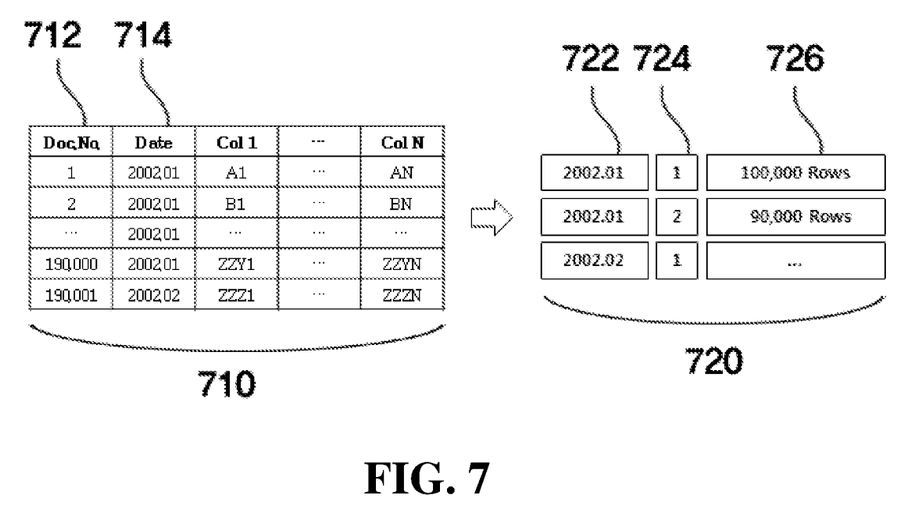
FIGS. 7 and 8 are views illustrating a compression table according to an exemplary embodiment of the present invention.
Figure 8:
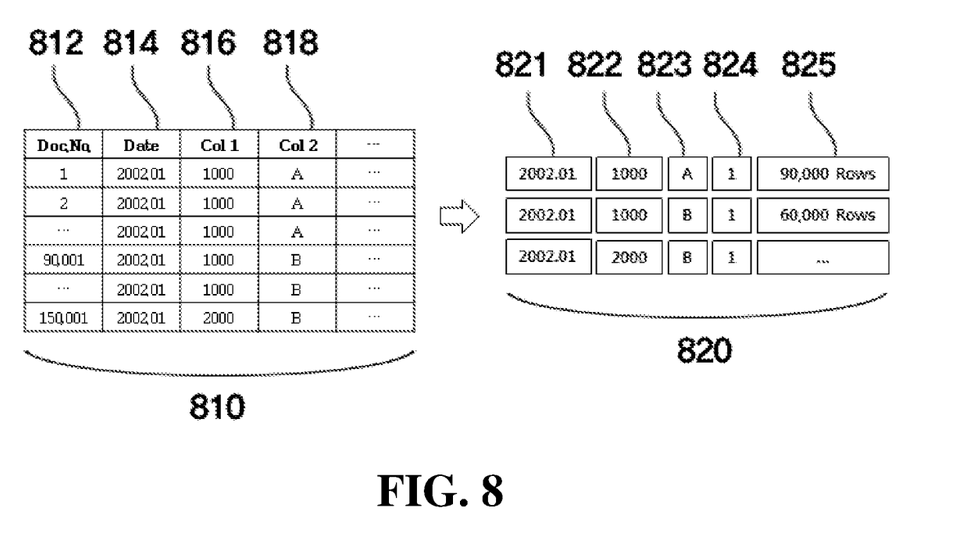

In the meantime, FIGS. 7 and 8 are views illustrating a compression table and a structure of the compression table will be described below.

Referring to FIG. 7, an original table 710 includes a Date field 714 for a time. In this case, after classifying the original table 710 based on a field value of the Date field 714 which is selection information on a time, group compression data 726 and selection information 722 on a time corresponding to the group compression data are stored in the compression table 720 for every classification result. In this case, the number of records whose value of the Date field 714 is 2002.01 is 190000 from 1 to 190000 by referring to the field value of a Doc.No. field 712, which exceeds 100000 which is the threshold value of the record group. Therefore, the record group may be divided into two record groups each including 100000 records and 90000 records. Further, group compression data corresponding to two divided record groups is created and 1 and 2 which are unique serial numbers 724 are assigned to the created group compression data 726 to be stored in the compression table 720.

Referring to FIG. 8, the original table 810 includes a Date field 814 for a time and Col1 field 816 and Col2 field 818 which are frequently retrieved fields. In this case, after classifying the original table 810 based on field values of the Date field 814, the Col1 field 816, and the Col2 field 818 which are selection information on a time and a field value, group compression data 825 and selection information 821, 822, and 823 corresponding to the group compression data are stored in the compression table 820, for every classifying result. That is, records having a value of the Date field 814 of 2002.01, a value of the Col1 field 816 of 1000, and a value of the Col2 field 818 of A are 90000 from 1 to 90000 by referring to the field value of the Doc.No field 812, so that 90000 records configure one record group and are created as group compression data 825 to be stored together with the corresponding selection information 821, 822, and 823. Similarly, records having a value of the Date field 814 of 2002.01, a value of the Col1 field 816 of 1000, and a value of the Col2 field 818 of B are 60000 from 90001 to 150000 by referring to the field value of the Doc.No field 812, so that 60000 records configure one record group and are created as group compression data 825 to be stored together with the corresponding selection information 821, 822, and 823.

As described above, according to the method of storing the selection information in the compression table according to the exemplary embodiment of the present invention, group compression data and selection information corresponding to the group compression data are stored in the same record of the compression table to efficiently find corresponding group compression data using only the selection information later.

Figure 3:
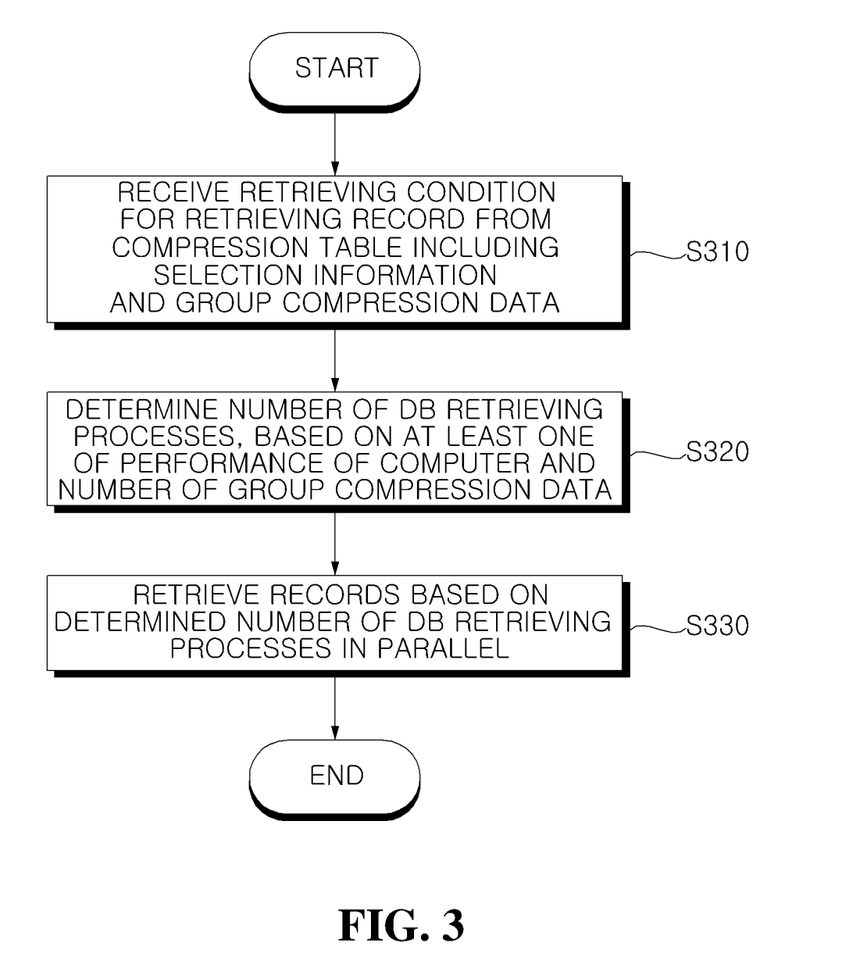
FIG. 3 is a flowchart illustrating an archived database retrieving method according to an exemplary embodiment of the present invention.

FIG. 3 is a flowchart illustrating an archived database retrieving method according to an exemplary embodiment of the present invention.

In step S310, a database retrieving device receives a retrieving condition for retrieving a record desired by a user from a compression table including selection information on at least one of a time and a field value and group compression data created by compressing a plurality of records corresponding to the selection information.

In this case, the received retrieving condition may be a structured query language (SQL) text type retrieving condition. That is, the database retrieving device may receive a retrieving condition in the form of SQL text to retrieve a record desired by the user from the compression table in which the group compression data and selection information corresponding to the group compression data are stored.

In this case, the user may create a retrieving condition for retrieving a record from the original table without knowing whether to retrieve the compression table and the database retrieving device may receive the created retrieving condition.

In step S320, the database retrieving device determines the number of DB retrieving processes for retrieving the records in parallel, based on at least one of a performance of a computer which performs the retrieval and the number of group compression data corresponding to the selection information satisfying the retrieving condition.

The DB retrieving process refers to a single process of retrieving a record from an archived database. Therefore, when the retrieval of the records is performed in parallel, it may be understood that a plurality of DB retrieving processes is simultaneously performed.

In the meantime, the reason that the number of DB retrieving processes is determined based on the performance of the computer is because during the DB retrieving process, a process of retrieving records from the compressed group compression data may apply a heavy load to the computer. Further, the reason that the number of DB retrieving processes is determined based on the number of group compression data corresponding to the selection information satisfying the retrieving condition is because the number of group compression data may be eventually related to an amount of retrieval or a retrieving range.

In the meantime, a specific process of determining the number of DB retrieving processes for retrieving the records in parallel will be described below in more detail with reference to FIG. 4.

Finally, in step S330, the database retrieving device retrieves records which satisfy the retrieving condition in parallel, based on the determined number of DB retrieving processes.

For example, the database retrieving device prepares DB retrieving processes as many as the determined number and retrieves the records in parallel by dividing the retrieving range for every DB retrieving process.

According to another exemplary embodiment, the database retrieving device allocates at least one group compression data to each of DB retrieving processes and retrieves records in parallel based thereon.

For example, when the number of group compression data corresponding to selection information satisfying the retrieving condition is six and the determined number of DB retrieving processes is four, the database retrieving device may allocate two group compression data to every two of four DB retrieving processes, respectively, and allocate one group compression data to each of the remaining DB retrieving processes. Through four DB retrieving processes, records for one or two allocated group compression data may be retrieved in parallel.

In this case, each DB retrieving process decompresses the allocated group compression data and stores the group compression data in the buffer and performs the retrieval through a process of retrieving records satisfying the retrieving condition from the data stored in the buffer.

According to another exemplary embodiment, the database retrieving device retrieves records satisfying a retrieving condition further based on table structure information which is information regarding a type, a size, an order, and a name of each field included in the original table which is archived to a compression table.

When the group compression data is decompressed to be stored in the buffer and records satisfying the retrieving condition are retrieved from the data stored in the buffer, if the database retrieving device knows the table structure information which is information regarding a type, a size, an order, and a name of each field included in the original table, the retrieval may be more easily performed based on the table structure information.

According to still another exemplary embodiment, the DB retrieving process may perform retrieval using a process or a thread allocated for every DB retrieving process.

Since each DB retrieving process needs to retrieve records in parallel, in order to satisfy the parallel characteristic, one child process or a thread may be allocated to every DB retrieving process to perform retrieval. In this case, whether to allocate a child process or a thread for every DB retrieving process may be determined based on whether there is a support depending on a CPU type or an OS type of a computer which performs the retrieval.

For example, when the number of DB retrieving processes is determined to be six, six child processes may be allocated to every DB retrieving process and six child processes may retrieve records for group compression data allocated to the DB retrieving process, in parallel.

As described above, according to the archived database retrieving method according to an exemplary embodiment of the present invention, the records may be retrieved in parallel based on the number of DB retrieving processes determined in accordance with a performance of a computer and a database retrieving range.

Figure 4:
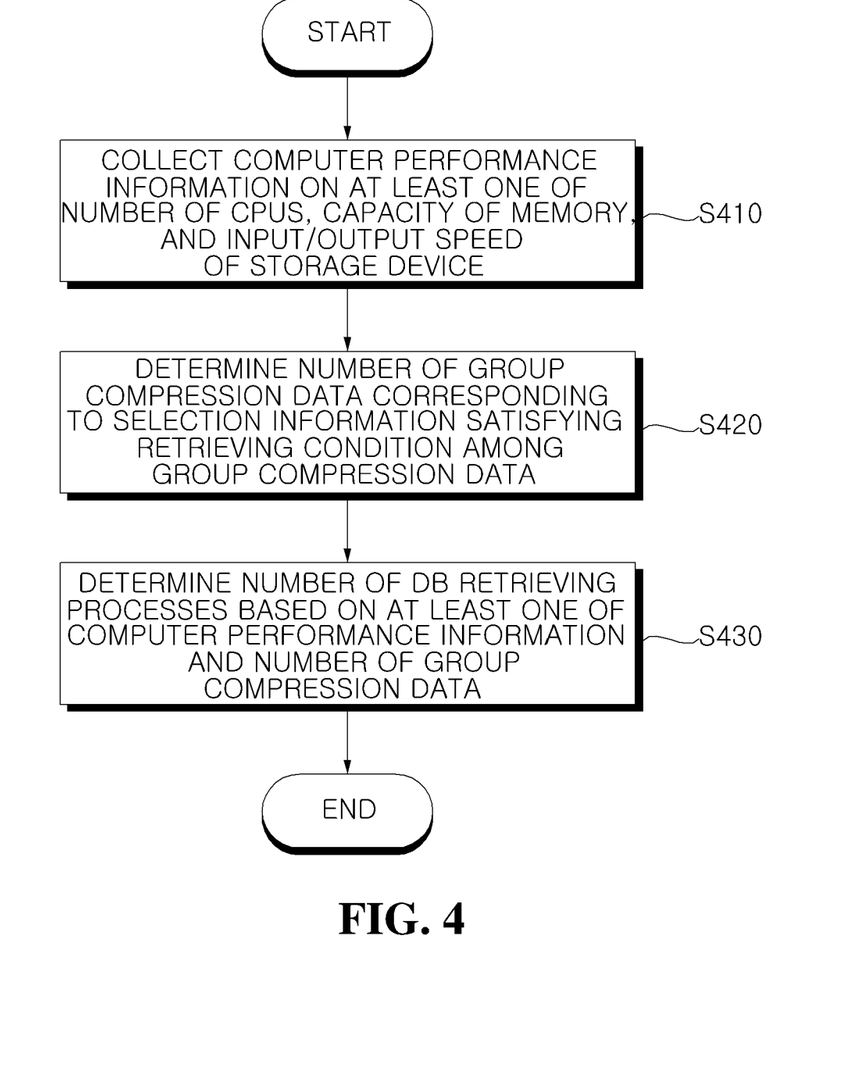
FIG. 4 is a flowchart illustrating a method of determining the number of DB retrieving processes according to an exemplary embodiment of the present invention.

FIG. 4 is a flowchart illustrating a method of determining the number of DB retrieving processes according to an exemplary embodiment of the present invention.

In step S410, the database retrieving device collects computer performance information on at least one of a number of CPUs included in the computer, a capacity of a memory, and an input/output speed of a storage device.

The performance of the computer may be determined by performances of a CPU, a memory, and a storage device included in the computer which retrieves the record. Specifically, the performance of the CPU may be determined by the number of CPUs installed in the computer, a clock frequency, a cash size, and the number of cores for every CPU. Further, the performance of the memory may be determined by a capacity and an operating clock frequency. Further, the performance of the storage device may be determined by the input/output speed.

Therefore, the database retrieving device may collect computer performance information including information on at least one of a CPU, a memory, and a storage device of a computer which retrieves the records.

In step S420, the database retrieving device determines the number of group compression data corresponding to the selection information satisfying the received retrieving condition among the group compression data stored in the compression table.

For example, when the user transmits a retrieving condition of January 2015 to October 2015, with respect to the selection information and the group compression data corresponding to the selection information stored in the compression table, if all selection information satisfying the retrieval condition is found, the number of group compression data corresponding to the selection information may be determined.

Finally, in step S430, the database retrieving device determines the number of DB retrieving processes for retrieving records in parallel, based on at least one of the collected computer performance information and the determined number of group compression data.

For example, the database retrieving device may comprehensively analyze the collected computer performance information and the number of group compression data to determine the number of DB retrieving processes for retrieving records in parallel.

More specifically, even though the collected computer performance information is not excellent, if the number of group compression data is not large, the number of DB retrieving processes may be determined to be small in accordance with the number of group compression data and in contrast, when the collected computer performance information is excellent but the determined number of group compression data is large, the number of DB retrieving processes may also be determined to be small in accordance with the computer performance information.

As described above, according to the method of determining the number of DB retrieving processes according to the exemplary embodiment of the present invention, the number of DB retrieving processes is determined by the number of group compression data corresponding to the information on the performance of a computer which performs the retrieval and the selection information satisfying the retrieving condition so that the records may be more efficiently retrieved in parallel.

Figure 5:
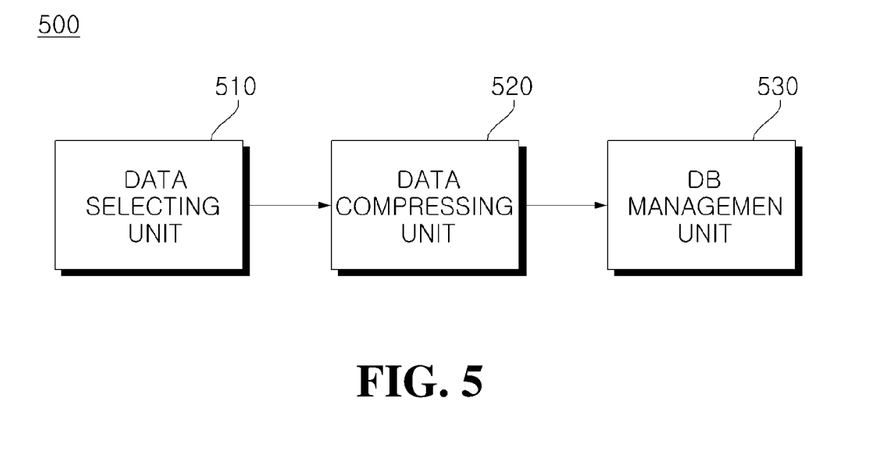
FIG. 5 is a view illustrating a database archiving device according to an exemplary embodiment of the present invention.

FIG. 5 is a flowchart illustrating a database archiving device according to an exemplary embodiment of the present invention.

Referring to FIG. 5, a database archiving device 500 includes a database selecting unit 510, a data compressing unit 520, and a DB management unit 530. In this case, the database archiving device 500 may be installed in a computer in which a database is installed or may be installed in a computer which is connected to the database through a network.

The data selecting unit 510 selects at least one record group including a plurality of records from an original table from which data is archived, based on selection information on at least one of a time and a field value.

The data compressing unit 520 compresses at least one selected record group for every record group to create group compression data.

The DB management unit 530 stores the group compression data and the selection information corresponding to the group compression data and deletes the plurality of records included in at least one selected record group from the original table.

According to another exemplary embodiment, the data compressing unit 520 stores data of a plurality of records included in at least one selected record group in a buffer and compresses the data stored in the buffer to create group compression data and the DB management unit 530 obtains selection information corresponding to the created group compression data and stores the group compression data in the same record as the selection information on the compression table.

According to still another exemplary embodiment, when there is an exceed record group in which the number of records exceeds a threshold value, among at least one selected record group, the data selecting unit 510 may further divide the exceed record group into a plurality of record groups in which the number of records is equal to or smaller than the threshold value and the DB management unit 530 may further store a serial number assigned to the plurality of divided record groups in the compression table.

Figure 6:
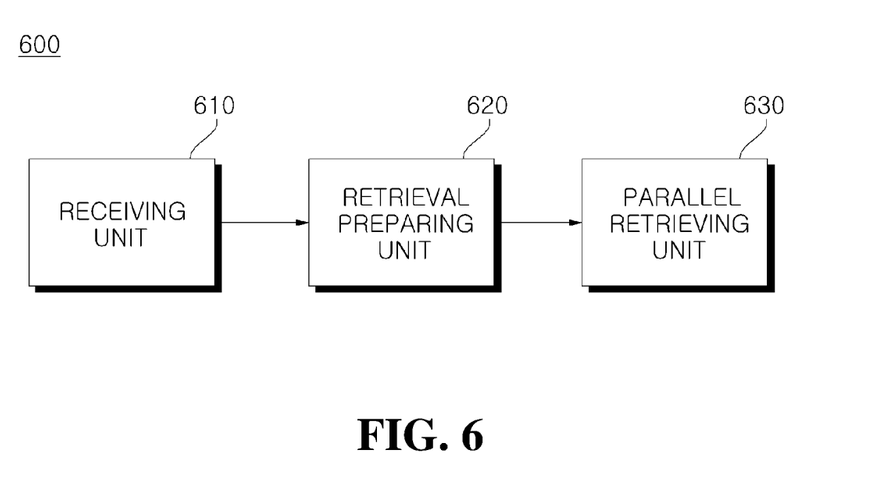
FIG. 6 is a view illustrating a retrieving device of an archived database according to an exemplary embodiment of the present invention.

FIG. 6 is a view illustrating an archived database retrieving device according to an exemplary embodiment of the present invention.

Referring to FIG. 6, the archived database retrieving device 600 includes a receiving unit 610, a retrieval preparing unit 620, and a parallel retrieving unit 630. In this case, the archived database retrieving device 600 may be installed in a computer in which a database is installed or may be installed in a computer which is connected to the database through a network.

The receiving unit 610 receives a retrieving condition for retrieving a record desired by a user from a compression table including selection information on at least one of a time and a field value and group compression data created by compressing a plurality of records corresponding to the selection information.

The retrieval preparing unit 620 determines the number of DB retrieving processes for retrieving the records in parallel, based on at least one of a performance of a computer which performs the retrieval and the number of group compression data corresponding to the selection information satisfying the received retrieving condition.

According to another exemplary embodiment, the retrieval preparing unit 620 may collect computer performance information on at least one of the number of CPUs included in the computer, a memory capacity, and an input/output speed of a storage device and determine the number of group compression data corresponding to the selection information satisfying the received retrieving condition, among the group compression data stored in the compression table.

The parallel retrieving unit 630 retrieves the records satisfying the received retrieving condition based on the determined number of DB retrieving processes, in parallel.

According to another exemplary embodiment, the parallel retrieving unit 630 may allocate at least one group compression data to each of the determined number of DB retrieving processes based on the number of group compression data corresponding to the selection information satisfying the retrieving condition and decompress at least one group compression data allocated for every DB retrieving process and retrieve the records satisfying the retrieving condition, in parallel.

According to still another exemplary embodiment, the parallel retrieving unit 630 may retrieve records satisfying a retrieving condition further based on table structure information which is information regarding a type, a size, an order, and a name of each field included in the original table which is archived to a compression table.

According to still another exemplary embodiment, the DB retrieving process may be performed using a process or a thread allocated for every DB retrieving process. The above-described exemplary embodiments of the present invention may be created by a computer executable program and implemented in a general use digital computer which operates the program using a computer readable recording medium.

The computer readable recording medium includes a magnetic storage medium (for example, a ROM, a floppy disk, and a hard disk) and an optical reading medium (for example, a CD-ROM and a DVD).

For now, the present invention has been described with reference to the exemplary embodiments. It is understood by those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

The invention claimed is:

1. A database archiving and retrieving method, comprising: selecting at least one record group including a plurality of records from an original table of a database from which data is archivable, based on selection information on at least one of a time and a field value;
   when a record group in the at least one selected record group has records the number of which exceeds a predetermined threshold value, dividing the record group into a plurality of record groups such that each of the plurality of divided record groups has records the number of which is equal to or smaller than the predetermined threshold value;

storing group compression data compressed to be created for every record group and the selection information corresponding to the group compression data in a compression table of the database, with respect to each of at least one selected record group;

receiving a retrieving condition for retrieving records from the compression table;

determining a number of database (DB) retrieving processes for retrieving the records in parallel, based on a performance of a computer which is configured to perform retrieval and the number of group compression data corresponding to the selection information satisfying the retrieving condition; and retrieving the records satisfying the retrieving condition in parallel, based on the determined number of DB retrieving processes, wherein the determining of the number of DB retrieving processes includes:

collecting computer performance information on at least one of a number of central processing units (CPUs) included in the computer, a capacity of a memory, and an input/output speed of a storage device;

determining the number of group compression data corresponding to the selection information satisfying the received retrieving condition among the group compression data stored in the compression table; and determining the number of DB retrieving processes for retrieving the records in parallel, based on the collected computer performance information and the determined number of group compression data, wherein the retrieving of the records satisfying the retrieving condition in parallel includes:

allocating at least one group compression data to each of the determined number of DB retrieving processes, based on the number of group compression data corresponding to the selection information satisfying the retrieving condition, so that all of the group compression data are allocated to all of the DB retrieving processes: and decompressing the at least one group compression data which is allocated for every DB retrieving process and retrieving the records satisfying the retrieving condition in parallel.

2. The database archiving and retrieving method of claim 1, wherein the storing of the selection information in the compression table further includes:

with respect to each of the at least one selected record group, storing data of a plurality of records included in each of the at least one selected record group in a buffer; creating the group compression data by compressing the data stored in the buffer;

obtaining the selection information corresponding to the created group compression data; and storing the group compression data in the same record on the compression table as the selection information.

3. The database archiving and retrieving method of claim 1, wherein the retrieving of the records satisfying the retrieving condition in parallel is performed further based on table structure information which includes information on a type, a size, an order, and a name of a field included in the original table which is archived to the compression table.

4. The database archiving and retrieving method of claim 1, wherein during the DB retrieving processes, the retrieval is performed using a process or a thread which is allocated to every DB retrieving process.

5. A database archiving and retrieving device, comprising:
at least one processor coupled to a memory, the at least one processor being configured to:

select at least one record group including a plurality of records based on selection information on at least one of a time and a field value, from an original table of a database from which data is archivable;

when a record group in the at least one selected record group has records the number of which exceeds a predetermined threshold value, divide the record group into a plurality of record groups such that each of the plurality of divided record groups has records the number of which is equal to or smaller than the predetermined threshold value;

compress and create group compression data for every record group, with respect to each of at least one selected record group;

store the group compression data and the selection information corresponding to the group compression data in a compression table of the database; and receive a retrieving condition for retrieving records from the compression table;

determine a number of database (DB) retrieving processes for retrieving the records in parallel, based on a performance of a computer which is configured to perform retrieval and the number of group compression data corresponding to the selection information satisfying the retrieving condition; and retrieve the records satisfying the retrieving condition in parallel, based on the determined number of DB retrieving processes, wherein the determining of the number of DB retrieving processes includes:

collecting computer performance information on at least one of a number of central processing units (CPUs) included in the computer, a capacity of a memory, and an input/output speed of a storage device;

determining the number of group compression data corresponding to the selection information satisfying the received retrieving condition among the group compression data stored in the compression table; and determining the number of DB retrieving processes for retrieving the records in parallel, based on the collected computer performance information and the determined number of group compression data, wherein the retrieving of the records satisfying the retrieving condition in parallel includes:

allocating at least one group compression data to each of the determined number of DB retrieving processes, based on the number of group compression data corresponding to the selection information satisfying the retrieving condition, so that all of the group compression data are allocated to all of the DB retrieving processes; and decompressing the at least one group compression data which is allocated for every DB retrieving process and retrieving the records satisfying the retrieving condition in parallel.

6. The database archiving and retrieving device of claim 5, wherein with respect to each of the at least one selected record group, the processor is further configured to:

store data of a plurality of records included in each of the at least one selected record group in a buffer and compresses the data stored in the buffer to create the group compression data, and obtain the selection information corresponding to the created group compression data and store the group compression data in the same record on the compression table as the selection information.

7. The database archiving and retrieving device of claim 5, wherein the at least one processor is configured to retrieve the records satisfying the retrieving condition in parallel, further based on table structure information which includes information on a type, a size, an order, and a name of a field included in the original table which is archived to the compression table.

8. The database archiving and retrieving device of claim 5, wherein during the DB retrieving processes, the retrieval is performed using a process or a thread which is allocated to every DB retrieving process.

* * * * *